United States Patent [19]

Siegrist, Jr.

[11] Patent Number: 5,340,030
[45] Date of Patent: Aug. 23, 1994

[54] SELECTIVE DISPENSING OF SUBSTANCES IN GRANULAR OR POWDER FORM

[76] Inventor: Raymond F. Siegrist, Jr., 107 Wild Elm Ct., Sanford, Fla. 32773

[21] Appl. No.: 24,287

[22] Filed: Mar. 1, 1993

[51] Int. Cl.⁵ .............................................. B05B 17/00
[52] U.S. Cl. ................................ 239/289; 239/562; 239/566; 137/625.31; 222/485; 222/516
[58] Field of Search ............ 239/275, 581.1, 554, 239/562, 566, 289; 137/625.31, 625.32; 222/513, 515, 516, 485

[56] References Cited

U.S. PATENT DOCUMENTS

| 929,597 | 7/1909 | Johnson . | |
|---|---|---|---|
| 963,342 | 7/1910 | Warters . | |
| 2,099,253 | 11/1937 | Bagby . | |
| 2,322,171 | 6/1943 | Spatz . | |
| 2,388,334 | 11/1945 | Leinweber | 239/581.1 |
| 2,493,599 | 1/1950 | Schroeder . | |
| 2,693,716 | 11/1954 | Ludwig . | |
| 2,991,914 | 7/1961 | Janssen, Jr. | 56/16.8 |
| 3,021,983 | 2/1962 | Blocksom | 222/485 |
| 3,152,732 | 10/1964 | Schulman et al. | 222/485 |
| 3,410,461 | 11/1968 | Barker | 222/516 |
| 3,857,515 | 12/1974 | Zennie | 239/562 |
| 4,638,948 | 1/1987 | Marlek . | |
| 4,863,069 | 9/1989 | Glaeser et al. | 222/485 |
| 4,878,602 | 11/1989 | Weigelt . | |
| 5,109,629 | 5/1992 | King, Jr. et al. | 239/289 |

FOREIGN PATENT DOCUMENTS

| 196093 | 2/1958 | Fed. Rep. of Germany | 222/516 |
|---|---|---|---|
| 2855906 | 7/1980 | Fed. Rep. of Germany | 239/562 |
| 3533091 | 3/1987 | Fed. Rep. of Germany | 239/289 |
| 2634146 | 1/1990 | France | 239/581.1 |

Primary Examiner—Andres Kashnikow
Assistant Examiner—Christopher G. Trainor
Attorney, Agent, or Firm—Julian C. Renfro

[57] ABSTRACT

A device for selectively dispensing granular material such as fire ant poison, herbicides, fertilizer and the like at the behest of a user, this device comprising inner and outer elongate tubular members disposed in a closely fitted relationship but being relatively rotatable for a selected number of degrees. The inner member serves as a repository for a granular material to be dispensed, and a plurality of holes are disposed in a spaced, aligned relationship in each of these members. These elongate members normally reside in a rotational relationship in which the holes in the members are non-aligned, and a dispensing lever is attached to one of the members for selectively bringing about relative rotation of that one member with respect to the other member, such that the holes in these members will be brought into alignment for the dispensing of the granular material under the influence of gravity. I prefer to utilize an arrangement serving to normally bias the holes into a non-aligned relationship, but the operator can readily and selectively bring about the dispensing of powder or granular material from the device by momentarily overcoming the bias of the biasing arrangement. My dispensing device can be utilized on a power mower in a substantially horizontal position, or on a string line trimmer in which it is disposed at a substantial angle to the horizontal.

19 Claims, 4 Drawing Sheets

SELECTIVE DISPENSING OF SUBSTANCES IN GRANULAR OR POWDER FORM

BACKGROUND OF THE INVENTION

In many parts of the United States, there has been an unfortunate invasion of fire ants. Fire ants are far more troublesome than ordinary ants, with the bite being much more painful than the bite of ants with which most citizens have become accustomed.

Fortunately, there are several poisons available on the market for controlling these troublesome invaders, with the most successful poison being of the type that is carried down into the burrow, where it reaches the queen. Typical poisons are Amdro, Logic and Spectricide, which are usually purchased in granular form.

Through the years various wheeled devices have been proposed for enabling granular substances and substances in powder form to be dispensed over wide areas of lawns, gardens, fields and the like, and byway of one example, the Schroeder U.S. Pat. No. 2,493,599 entitled "Single-Row Fertilizer Applicator" involves a substantially cylindrical casing or container that may be constructed of sheet metal and that may have a single discharge port or aperture formed in the sidewall of the container near the lower end thereof. Schroeder supports his device from a single wheel, and he provides a valve arrangement as well as a control means therefor. This involves a flexible wire or cable furnished with a finger grip, and by pulling on the finger grip, the user can cause fertilizer to be dispensed in a selected location. Although probably suitable for dealing with fertilizer, this type of device would be needlessly expensive and not highly effective for dispensing a granular substance over a comparatively wide area.

A different approach was taken by Marlek in his U.S. Pat. No. 4,638,948 entitled "Liquid Chemical Applicator for Treatment of a Horizontal Surface," for he utilizes a dual wheeled device having fairly elaborate means for dispensing a liquid chemical by the use of numerous spray nozzles, through which the liquid chemical can be dispensed as a result of the pressure supplied by a pump. This approach would not be suitable for use if the substance being dispensed is in either a granular form or powder form.

It was to overcome the shortcomings and disadvantages of these prior art devices that the present invention was evolved.

SUMMARY OF THE INVENTION

In accordance with this invention I have provided a device for selectively dispensing at the behest of a user, certain substances in granular or powder form from any of a wide range of devices, both wheeled devices as well as hand-held implements. My novel dispensing device may advantageously be utilized in combination with a mowing device, so as to make it possible for a person concerned with lawn care to mow and to kill fire ants in much less time than is involved if these operations were to be conducted separately. The preferred embodiment of my dispensing device comprises perforate inner and outer elongate tubular members residing in a closely fitted relationship, with one of these tubular members being rotatable with respect to the other. The inner tubular member serves as a repository for a substance of either granular or powder form that is to be selectively dispensed.

A plurality of holes disposed in a spaced, aligned relationship is utilized in each of the members, with these members normally residing in a rotational relationship in which the holes in the members are non-aligned. Operative means are attached to the movable member for selectively bringing about relative rotation of such member with respect to the fixed member. I may refer to such operative means as a lever or as a rotation producing means. As a result of a user bringing about such relative rotation, the holes in the tubular members can be brought into alignment, and such holes, when in an aligned relationship, permit the dispensing of the granular or powder substance from the inner tubular member under the influence of gravity.

Although manifestly not limited to being used on a power mower, edgar, string line trimmer (weed eater), or other such implement, my novel dispensing device represents a particularly useful addition to a power mower or a hand-held device, such that a poison for fire ants can be selectively dispensed by the user at such time as a fire ant mound is encountered. So that the user will not need to remove either hand from the controls of a power mower, I may provide a foot operated lever disposed in an operative relationship with the tubular member that is relatively movable with respect to the other member. In this way the movable tubular member can be readily moved to the dispensing position for a desired length of time.

For a hand carried implement such as a weed whip, I prefer to utilize a cable connection such that a hand operated lever can be utilized for bringing about the rotation of the rotatably mounted tubular member toward and away from the dispensing position. Whichever the form, the operating lever or handle is typically spring biased into a position in which the holes provided in the tubular members are in a non-dispensing relationship. At such time, however, as a fire ant mound or any other basis for dispensing is encountered, the user can slow the motion over ground of the mower or hand-held implement, and then manipulate the lever to a position in which the holes in the tubular members are moved, for a limited length of time, into an aligned relationship. Depending on the size of the infestation in the case of fire ants, the holes may be maintained in the aligned relationship for only a fraction of a second, or for a time amounting to several seconds, in which the powder or granular material is dispensed.

As is obvious, when the operating lever is released, the spring bias means causes the holes to be returned to the non-aligned relationship, thus causing the dispensing of the powder or granular substance or material to cease.

In view of the fact that only a finite amount of powder or granular material can be contained in the inner tubular member, I provide on one end, a particularly convenient means permitting more of the powder or granular substance to be added when such becomes necessary.

Although described in conjunction with the control of fire ants, my novel dispensing device is capable of several other uses, such as for dispensing fertilizer in powder or granular form. Still other usages involve the dispensing of fungicide, insecticide, herbicide, or the like.

My novel dispensing device can be mounted on its own wheeled implement, but as is readily apparent, by mounting it on a power mower, string line trimmer (weed wacker) or the like, the user can momentarily pause from mowing operations in order to dispense the granular or powder substance on an as-needed basis, and then promptly return to mowing.

A principal object of my invention is therefore to provide a low cost yet highly effective arrangement for the selective dispensing of a substance in either granular or powder form onto the ground.

It is another object to provide a device enabling a mowing function to be advantageously combined with a fire ant destroying function, thereby making it possible to accomplish these functions in much less time than is involved when the mowing and the fire ant destruction must be accomplished separately.

It is yet another object of my invention to provide a device comprising inner and outer tubular members each provided with a spaced set of holes, with these members disposed in a closely fitted and relatively rotatable relationship, and with means utilized for causing one of the members to be selectively rotated with respect to the other in order that a granular or powder substance can be dispensed from holes brought into alignment.

It is still another object of my invention to provide a dispensing device that may be incorporated either as original equipment into the design of a wheeled or hand-held implement, or retrofitted into such an implement, for the selective dispensing of a granular or powder substance therefrom.

It is yet still another object of my invention to provide a low cost yet highly effective insecticide dispensing device able to be readily attached to a power mower, so that the user of the mower can dispense insecticide each time a fire ant mound is encountered during a mowing operation, merely by momentarily operating a dispensing lever against the bias of a suitable bias means, such that no second trip to such location is required.

It is yet still another object of this invention to provide a dispensing device able to be easily installed on a power mower or string line trimmer, so that insecticide, herbicide or fertilizer can be selectively dispensed during grass cutting operations without compromising the ability of the mower to accomplish a mowing operation.

It is yet still another object to provide a dispensing device for attachment on a power mower, which is biased into the non-dispensing position, but that can be readily caused by the operator to dispense a powder or granular substance upon the operator overcoming the bias by the use of his foot or his hand.

These and other objects, features and advantages will be more apparent from a study of the appended drawings and descriptions provided therefor.

BRIEF DESCRIPTION OF DRAWINGS

FIG. 1 is a perspective view of a first embodiment of my invention, particularly designed for use on a power mower, wherein relatively rotatable inner and outer members are utilized, such that a poison, fertilizer or the like can be dispensed when the holes in these members are selectively moved against an elastic bias from the illustrated, non-aligned relationship, into an aligned relationship;

FIG. 1a is a fragmentary perspective view of an embodiment of my invention in which a spring bias has been substituted for the elastic bias utilized in FIG. 1 for biasing the rotatable member to a non-dispensing position;

FIG. 1b is a fragmentary perspective view revealing the employment of a rotatable end member utilized in connection with the spring bias arrangement of FIG. 1a;

FIG. 2 is a view of the same device shown in FIG. 1 except in this instance, the holes in the relatively rotatable elongate inner member have been moved into alignment with the holes of the outer member, so as to be in a dispensing position;

FIGS. 9 through 11 represent embodiments of my invention that may be installed on a power mower, edger or the like; and FIG. 12 reveals the utilization of a form of my invention when used on a weed whip or weed wacker.

DETAILED DESCRIPTION

Figures 1, 1A, 1B, 2:
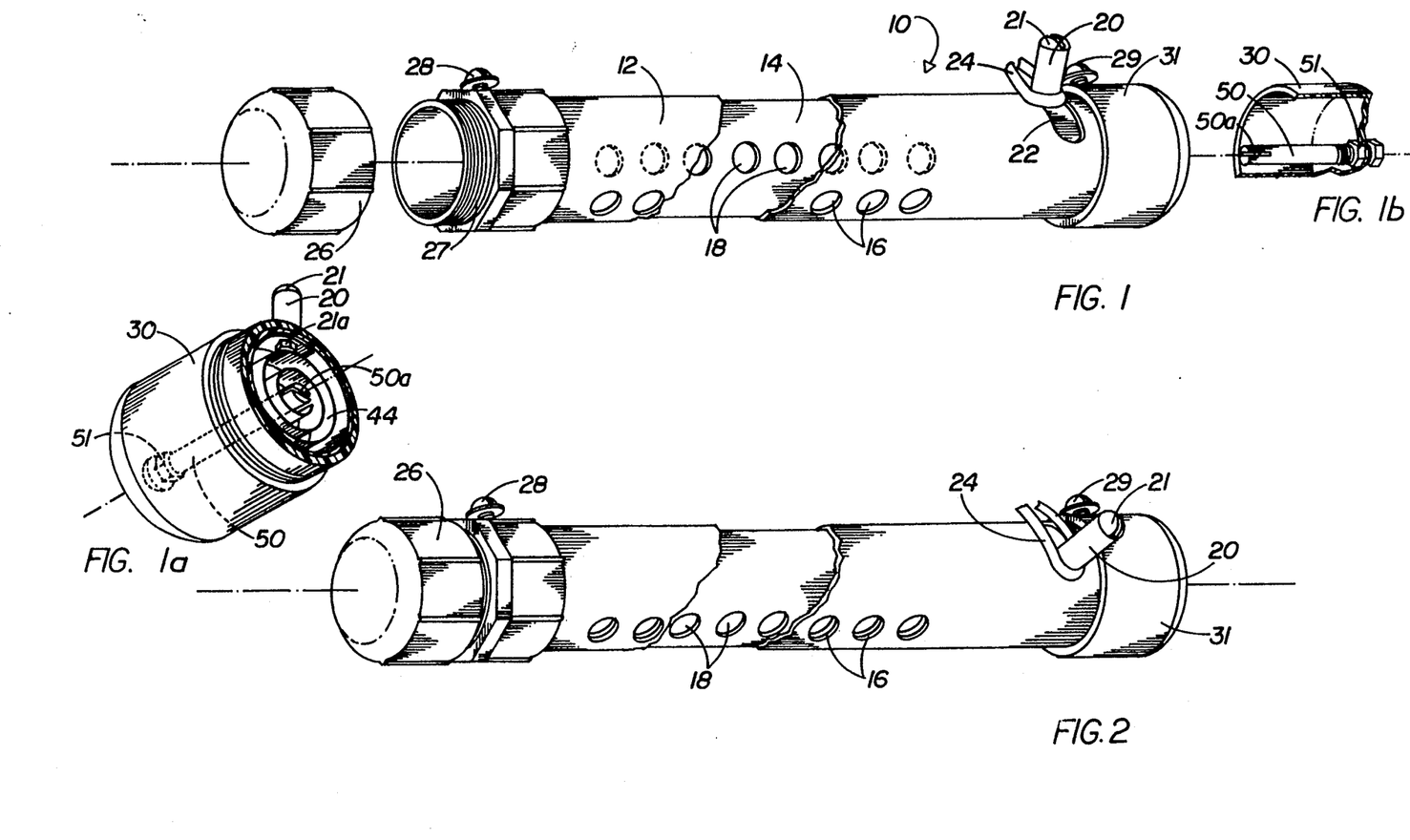

With initial reference to FIG. 1, it will be seen that I have shown a preferred embodiment for the selective dispensing of a granular or a powder substance or material from a dispensing device 10 comprising an outer elongate tubular member 12 and an inner elongate tubular member 14. It is to be understood that these two members reside in a closely fitted relationship, with the outer diameter of the inner member being relatively close to the inner diameter of the outer member. However, the fit is not so close but what one of these members is relatively rotatable for a selected number of degrees with respect to the other one. The inner elongate tubular member 14 is intended to be the repository for granular or powder substance that is to be selectively dispensed by the user of my device. In one embodiment of my invention, I utilized thin-walled PVC, with the outer diameter of the outer member being approximately 1½ inches in diameter, and the outer diameter of the inner being approximately 1¼ inches in diameter, but obviously I am not to be limited to this particular size relationship nor to the use of PVC.

It is to be noted from FIG. 1 that a series of aligned, spaced holes 16 are provided along a lower portion of member 12, and a series of aligned spaced holes 18 are provided along a lower portion of member 14. The set of holes 16 in member 12 are evenly spaced along a straight line, and the set of holes 18 in member 14 are evenly disposed along a straight line. The between-hole spacing of both of these sets of holes is the same, and the lateral placement of the sets of holes is closely similar, such that the holes of one member can be brought into substantial alignment with the holes of the other member at the time of relative rotation. A suitable bias is utilized for normally biasing the members into a rotational relationship in which the one set of holes is out of alignment with the other set of holes. Upon an appropriate amount of relative rotation of one tubular member with respect to the other tubular member, both sets of holes can be brought into alignment. Because of this, suitable amounts of granular or powder substance contained in the inner member can be selectively dispensed under the effect of gravity through the aligned holes, merely by the operator maintaining against the bias, the holes in a substantially aligned relationship for an appropriately short length of time.

In the preferred embodiment depicted in FIGS. 1 and 2, the inner member 14 may be regarded as relatively movable, whereas the outer member 12 is to be rigidly mounted, such as to a suitable structural member on a power mower, in a generally horizontal manner. As revealed in these Figures, I utilize support member 28 adjacent one end of the outer member, and support member 29 adjacent the opposite end of the outer member. On the other hand, my invention can also be implemented by an arrangement in which the inner member is rigidly mounted, and the outer member is relatively rotatable with respect thereto. Such an alternative arrangement will be discussed shortly.

Inasmuch as there usually is no occasion to be dispensing the granular or powder substance from the inner tubular member on a continuous basis, I construct my device such that the tubular members 12 and 14 normally reside in the relationship depicted in FIG. 1, in which the holes 18 in the inner tubular member 14 are biased to an out-of-aligned relationship with the holes 16 provided in the outer tubular member 12. It will be seen from the embodiment depicted in FIGS. 1 and 2 that I utilize an elastic type bias arrangement or bias means 24 serving to bias the tubular members 12 and 14 into a relationship in which the holes are not aligned. The bias means 24 can take the form of a bungee cord, rubber band, or another type of elastic device. As is obvious, the amount of bias utilized in a given instance can be easily modified by changing the strength of the bungee cord or other elastic type device that is utilized.

So that the user can readily bring about a dispensing of granular or powder substance under the influence of gravity, I prefer to mount an operating lever 20 on the tubular member that is to be rotated relative to the other member, and in the preferred embodiment illustrated in FIGS. 1 and 2, it is to be noted that the operating lever 20 is rigidly attached by means of an elongate bolt 21 to the sidewall of the inner tubular member 14. The lever 20, also known as a dispensing lever or rotation producing means, normally resides in approximately a perpendicular relationship to the member 14, but I am not to be limited to this.

So that motion of the lever 20 will be possible, I provide an arcuate slot 22 in the sidewall of the outer member 12, thus permitting the lever 20 to be readily moved, at the behest of the user, from a non-dispensing location as illustrated in FIG. 1, to a dispensing location as illustrated in FIG. 2. Typically the slot 22 does not extend for an angular amount exceeding 90°, but I am not to be limited to this. It will be noted that a non-rotatable closure member 31 is utilized adjacent the right hand end of the outer tubular member 12 of the embodiment of my invention illustrated in FIG. 1.

As is obvious, the inner tubular member 14 will return to a non-dispensing orientation with respect to the outer tubular member 12 as soon as pressure is released from the lever 20, as a result of the provision of the elastic type bias means 24.

It is to be understood that I am not to be limited to an elastic type bias, for in FIG. 1a I have shown a clock spring type bias. The advantage of the type of bias shown in FIG. 1a is that the user can adjust the strength of the bias slightly more easily than by changing the strength of the elastic member.

It is to be understood that a hole is provided adjacent the outer end of the spring bias 44 depicted in FIG. 1a, such that this outer end can be attached under the nut 21a, and thus be held in a fixed relationship to the interior of rotatable tubular member 14. FIG. 1a makes clear that the inner end of the spring 44 engages the slotted end 50a of the bolt 50, that resides along the longitudinal centerline of the closure member 30; note FIG. 1b. By the use of the lock nut 51 depicted in FIGS. 1a and 1b, the bolt 50 is fixed so as to rotate with the closure member 30. The closure member 30, unlike closure member 31, is not sealed to the tubular member 12. The closure member 30 does, however, fit relatively tightly on the end of the outer tubular member 12, although the fit is not so tight but that with a degree of effort, the closure member 30 can be rotated with respect to the member 12, thus to be able to change the bias of the spring 44.

As is obvious, by rotating the closure member 30 in the appropriate direction, the bias provided by the clock type spring 44 can be readily increased or decreased, to meet the needs of the particular utilization of my device. Although as previously mentioned, the closure member 30 fits closely around the end of the member 12 so as to maintain the rotative position in which it is placed, a type of set screw could, if necessary, be installed in the sidewall of closure member 30, that could be brought into contact with the member 12 in order to prevent member 30 from rotating, under the influence of a tightly wound clock spring, with respect to the tubular member 12. My device could also be designed to utilize a tension spring, a torsion spring, or the like.

As a consequence of the use of the relatively rotatable inner elongate tubular member provided with holes provided in a spaced, aligned relationship with respect to the holes in the outer tubular member, an appropriate amount of granular or powder substance contained in the inner member can be selectively dispensed under the effect of gravity through the aligned holes, with the precise amount of granular or powder substance dispensed in a given instance being dependent upon the length of time the holes are maintained by the operator in a partially aligned or fully aligned relationship.

It is obvious that only a tangible amount of granular or powder substance can be contained in the interior of the inner member 14, so I provide a ready means by which more powder or granular substance can be poured into the inner tubular member 14 at such time as refilling becomes necessary. As is to be seen from FIGS. 1 and 2, the refilling of the inner tubular member is made possible by removing the closure member 26 that is removably attached to one end of the outer tubular member 12. Obviously I am not to be limited to the use of an internally threaded closure member 26, but in the event such is used, I provide suitable male threads 27 around one end of the outer tubular member 12, as visible in FIG. 1, such that the closure member 26 may be received in a secure manner thereon. As previously mentioned, a non-removable closure member 31 is utilized on the opposite end of the tubular members from the closure member 26 when the elastic type bias is used, to prevent an undesired loss of granular or powder material from the device.

Figures 9, 10, 11, 12:
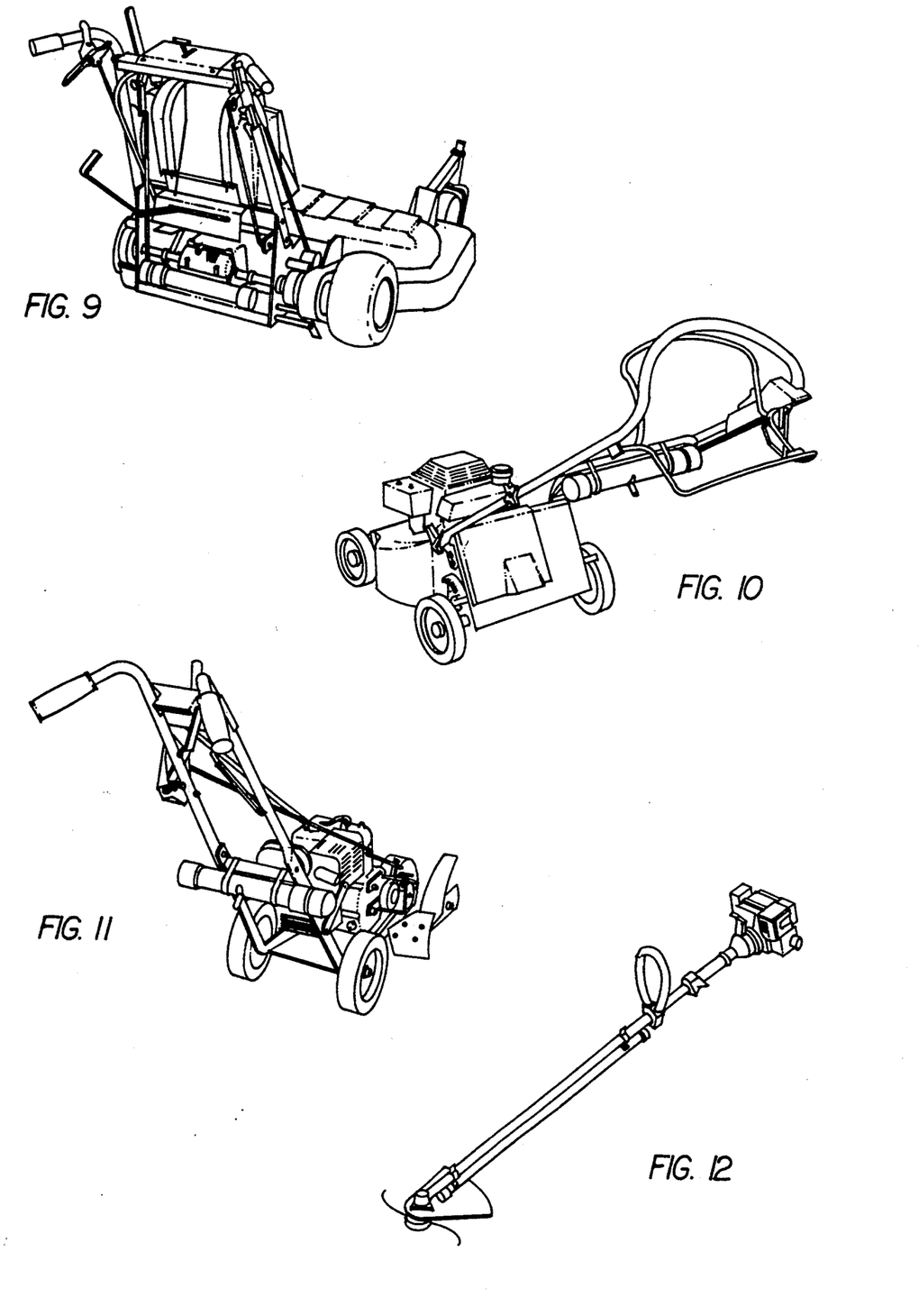

The embodiment of my invention depicted in FIGS. 1 and 2 is typically utilized in a horizontal attitude, such as depicted on the machines shown in FIGS. 9 through 11.

Figures 3, 3A, 4:
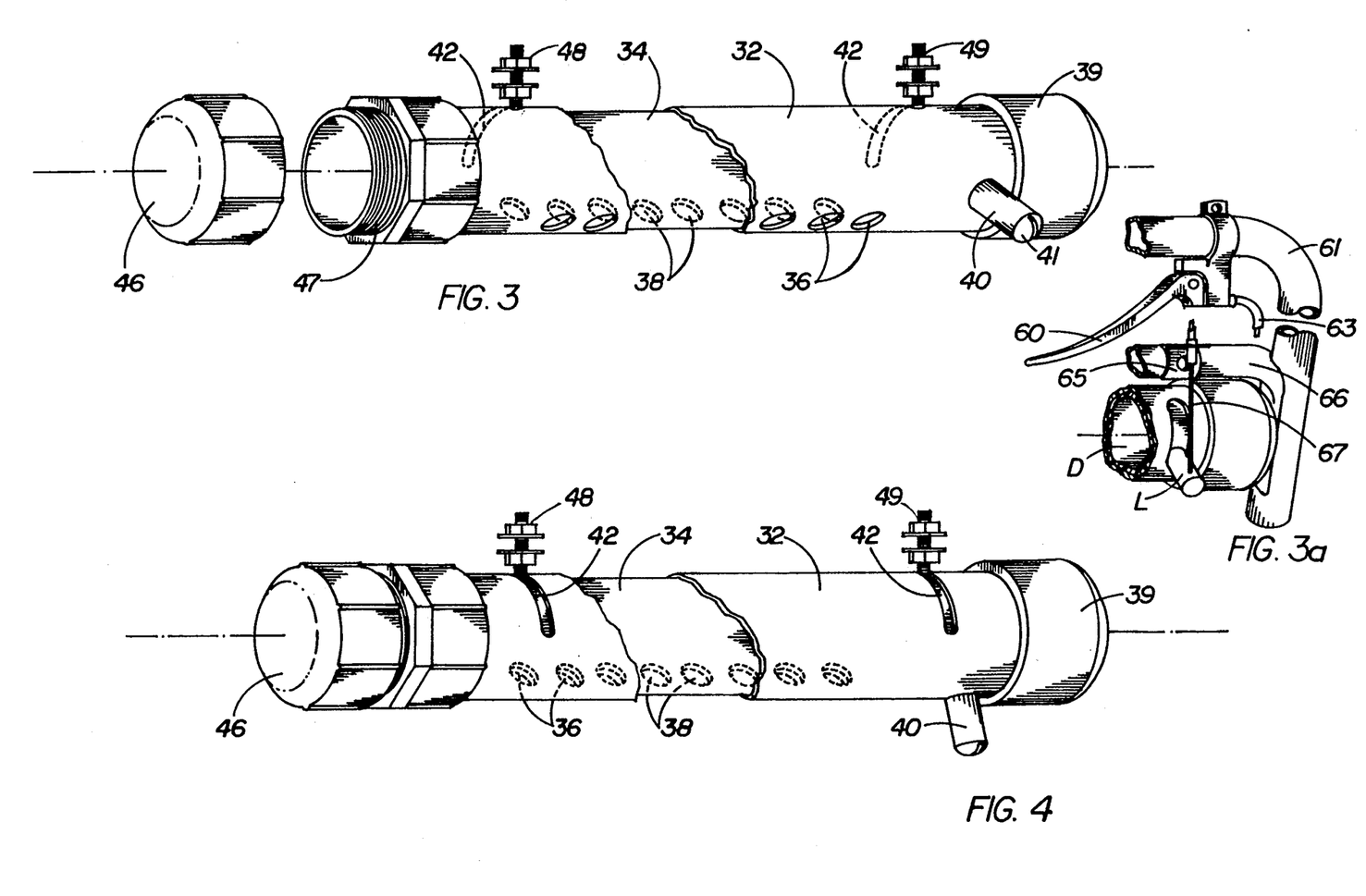
FIG. 3 is a perspective view of another embodiment of my invention, in this instance involving a fixed elongate inner member and a relatively rotatable elongate outer member.
FIG. 3a is a fragmentary perspective view revealing how a hand-operated lever mounted on a handle bar of a grass cutting machine can be utilized for causing granular or powder material to be selectively dispensed.
FIG. 4 is a view of the same device shown in FIG. 3 except in this instance, the holes in the relatively rotatable elongate outer member have been moved into alignment with the holes of the elongate inner member.

Turning now to the embodiment depicted in FIGS. 3 and 4, it will there be seen that I have provided an arrangement in which the outer tubular member 32 is movable, whereas the inner member 34 is fixed, being maintained in a desired position by support 48 on the left and support 49 on the right. An operating lever 40, also known as a dispensing lever, is held in place adjacent the right hand end of the outer tubular member 32 by means of a bolt 41, which extends through the lever 40 and the sidewall of the outer member 32, and which is threadedly engaged on the interior of the member 32 by a suitable nut (not shown). A closure member 39 is snugly fitted on the end of the member 32, adjacent the lever 40, in the manner depicted in FIGS. 3, 3a and 4.

Appropriate slots 42 are provided in the outer member 32 at the location of these supports, so that the outer tubular member 32 can be moved in rotation with respect to the inner member 34 of fixed position. In accordance with this arrangement, granular powder or the like can be dispensed under the influence of gravity from the holes of these tubular members upon such holes being brought into registry or alignment. In a manner resembling the previous embodiment, a set of holes 36 are evenly spaced along the underside of the member 32 in a straight line, and a set of holes 38 are also evenly spaced along the underside of the member 34, disposed along a straight line. The between-hole spacing of both sets of holes 36 and 38 is the same, and the lateral placement of the holes is closely similar, such that with relative rotation brought about by manipulation of the lever 40, the holes of one member can be brought into substantial alignment with the holes of the other member.

Therefore, in the embodiment shown in FIGS. 3 and 4, upon an appropriate amount of rotation of outer tubular member 32 against the bias provided by a suitable elastic or spring type bias means, both sets of holes can be brought into substantial alignment. Because of this, the granular or powder substance contained in the inner member can be selectively dispensed under the effect of gravity through the aligned holes, with the precise amount of granular or powder substance dispensed in a given instance being dependent upon the length of time the holes are maintained in a partially aligned or fully aligned relationship by the operator.

A closure means 46 is threadedly mounted on threads 47 located on the end of the outer member 32. Replenishment of the granular or powder material contained in the inner member 34 can be readily accomplished by removal of the closure means 46, and after this replenishment, the closure means is reapplied to the threads 47 in an appropriately tight manner.

As in the case of the previous embodiment, the embodiment of FIGS. 3 and 4 is ideal for utilization in a generally horizontal attitude on a power mower or edger, such as shown in FIGS. 9, 10 and 11.

Turning now to a consideration of the device depicted in FIG. 3a, it will be seen that I have utilized a hand-operated means for manipulating the dispensing lever L that is depicted as being attached to the inner tubular member of dispensing device D. As shown in this Figure, the lever L is movable along a slot shown in the outer tubular member of dispensing device D. I prefer to use an arrangement in which the dispensing lever L, when in the upward position, brings about a non-alignment of the holes of the dispensing device D, but when the lever L is moved down along the slot shown in FIG. 3a, the lever L causes the holes to be aligned, and either granular or powder material to be dispensed. Obviously I am not to be limited to this particular arrangement.

Continuing with a consideration of FIG. 3a, the hand-operated lever 60 is operatively attached to a tubular member 61 of the grass cutting device, such as to the handle bar of a power mower or edger, or of a string line trimmer in the nature of a weed eater. The lever 60 is attached to a sheathed cable 63, with this arrangement bearing a distinct resemblance to the hand-operated brake arrangement for a bicycle or a motorcycle.

The outer end of the sheathed portion of the cable 63 is affixed to a fitting 65 that is mounted on a structural member 66 adjacent the end of the dispensing device depicted in FIG. 3, whereas the active interior portion or wire 67 of the sheathed cable 63 is firmly attached to the dispensing lever L, such as extending through a hole drilled adjacent the end of the lever L. In some instances I will use a bias means directly associated with the rotatable tubular member of the dispensing device D, but in other instances I can use a bias means associated with the hand-operated lever 60, for accomplishing a return of the holes of the dispensing device D to the non-dispensing position. In either event, the arrangement in accordance with FIG. 3a enables the operator to carefully and selectively dispense granular or powder material from the dispensing device D.

Figure 5:
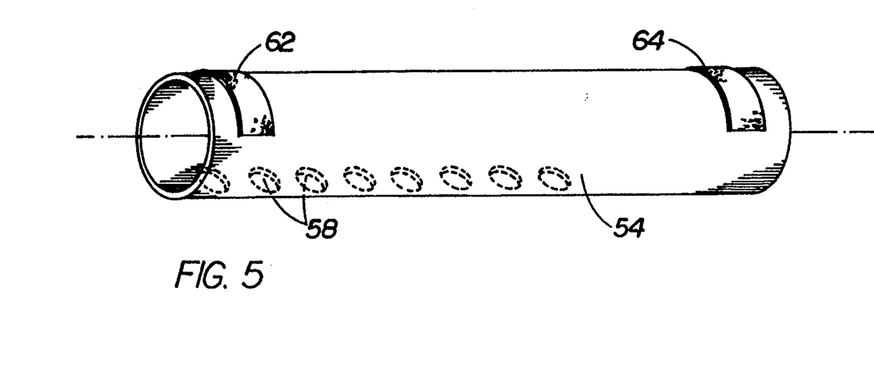
FIG. 5 is a perspective view of a single elongate member of tubular construction of the previously described type, wherein I reveal the use of a strip of Velcro or other such material adjacent each end of the elongate inner member, to minimize leakage by causing the inner member to fit tightly inside the outer member.

With reference now to FIG. 5, it will be noted that I have shown a typical inner member 54 of tubular construction, containing holes 58 evenly spaced along the underside of the member, with these holes being disposed along a straight line. The between-hole spacing of these holes is of course the same as the spacing of the holes of the outer member to be used therewith, which is not illustrated in FIG. 5, but which is to be seen at 52 in FIG. 6.

Figure 6:
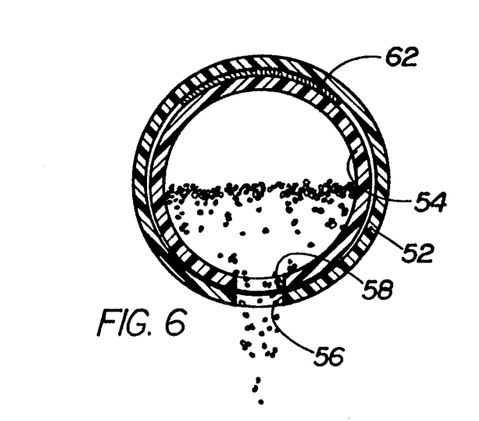
FIG. 6 is a cross-sectional view, showing how the holes of the inner member of FIG. 5 are held in close relationship to the holes of the outer member, by the use of strips of material on the inner member.

As previously explained, fire ant poison, herbicides, insecticides, fertilizer or the like can be contained in the interior of the member 54, in the manner shown in FIG. 6. As is obvious, this granular or powdery material can be dispensed under the influence of gravity from the interior of member 54 through the downwardly directed holes 58 at such time as these holes are in the alignment with the holes 56 in the outer member 52.

It is significant to note in FIG. 5 that I have secured patches or strips 62 and 64 of material such as Velcro adjacent the ends of the interior member 54. The patches or strips extend around the outer circumference for a similar extent, such as for 45° to 90°, and are typically held in place by a suitable glue or cement. It is the purpose of these strips to hold the holes 58 of the inner tubular member 54, in close proximity to the holes 56 of the outer tubular member 52, and to that end, it will be seen in FIG. 6 that the strip 62 is disposed in a substantially opposite location to the hole 58.

I am not to be limited to the use of Velcro, but I have found that this material has the characteristic of providing a suitable bias causing the lower exterior portion of the inner member 54 to be held in close contact with the interior portion of the outer member 52 at the location of the holes. In this way, this arrangement prevents any of the particulate material being dispensed from the interior of the member 54 from finding its way into the space between the inner and outer members and then falling to the ground from the series of outer holes 56 in unwanted locations. The Velcro does not form any consequential hinderance to the relative rotation of one member with respect to the other, and is to be applied to the exterior of the inner tubular member 54 at a location opposite the holes 58.

Figure 7:
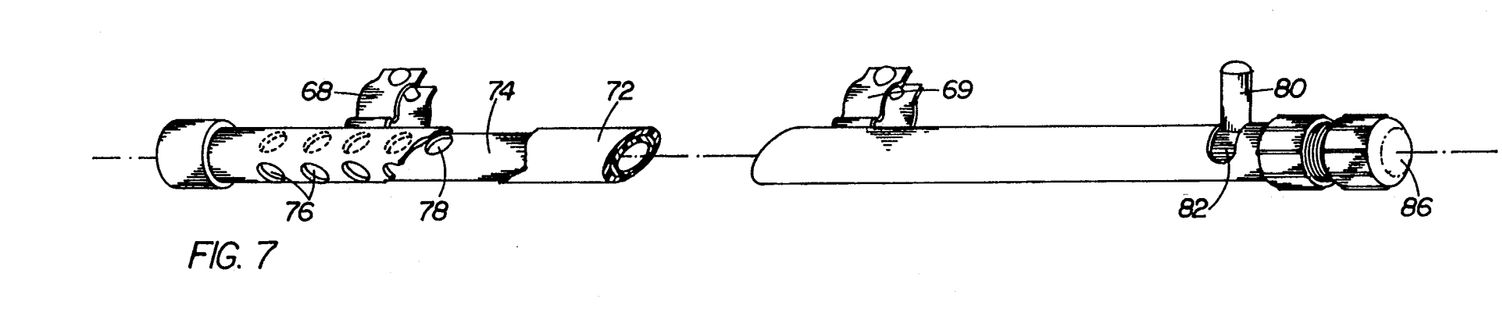
FIG. 7 is an embodiment in which the members have been substantially elongated for use on a weed whip, weed wacker or the like, wherein the inner member is relatively rotatable.
Figure 8:
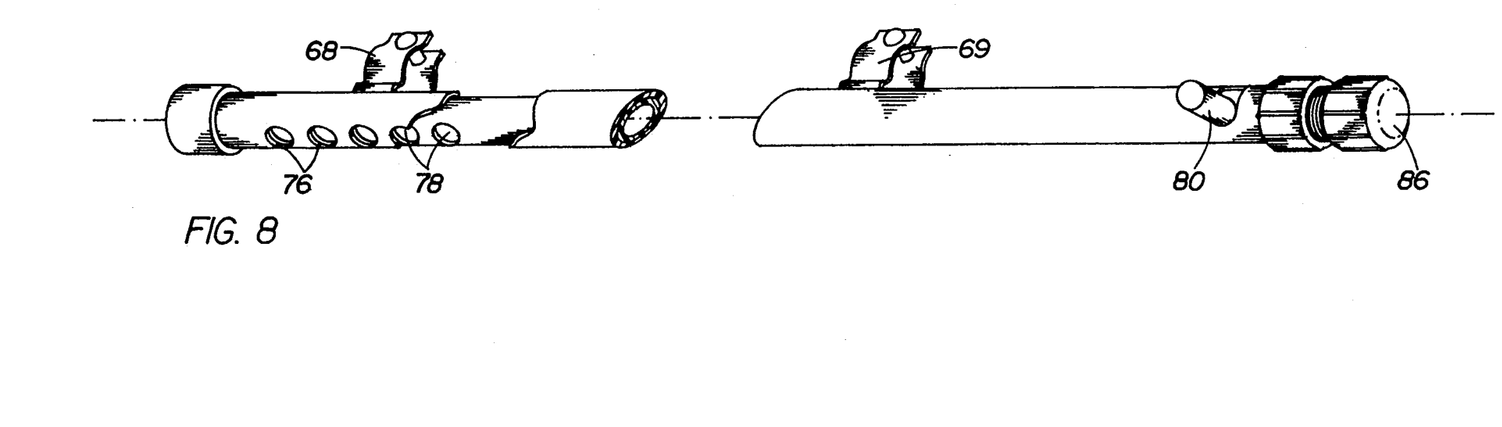
FIG. 8 is a view of the same device shown in FIG. 7 except in this instance, the holes in the relatively rotatable, substantially lengthened inner member have been moved into alignment with holes of the substantially lengthened outer member.

In FIGS. 7 and 8, I reveal an arrangement in which the inner and outer members have been lengthened so as to be particularly adapted for utilization on a weed whip, weed wacker or the like, wherein a short length of plastic cord is driven at a high rate of speed in a circular motion about the end of a supporting tube or the like that is typically held at approximately a 45° angle to the ground. Such a cutting device is well known in the art, and is particularly effective for cutting grass or brush growing in locations close to a wall, fence or tree, where for lack of access, such grass cannot be cut by a power mower or other such means.

In the embodiment of FIGS. 7 and 8, the outer tubular member 72 is fixed, being supported by support devices 68 and 69, whereas the inner member 74 is rotationally movable. In accordance with this arrangement, granular powder or the like contained in the inner member 74 can be dispensed from the holes of these tubular members upon the two sets of holes being brought into registry or alignment. In a manner resembling the previous embodiments, a set of holes 76 are evenly spaced along the underside of the outer member 72 in a straight line, and a set of holes 78 are disposed along the underside of inner member 74 in a straight line. The between-hole spacing of both sets of holes 76 and 78 is the same, and the lateral placement of the two sets of holes is closely similar, such that with an appropriate amount of relative rotation, the holes of one member can be brought into substantial alignment with the holes of the other member.

In the illustrated instance, a dispensing lever 80 is attached to the inner member 74, with an arcuate slot 82 in the sidewall of the outer member 72 permitting motion of the lever 80 against the bias provided by a suitable bias means 84. Therefore, in the embodiment shown in FIGS. 7 and 8, upon an appropriate amount of rotation of inner tubular member 74, the set of holes 78 in the member 74 can be brought into substantial alignment with holes 76 contained in the outer member. Because of this, the granular or powder substance contained in the inner member 74 can be selectively dispensed under the effect of gravity through the aligned holes, with the precise amount of granular or powder substance dispensed in a given instance being dependent upon the length of time the holes are maintained in a substantially aligned relationship by the operator.

Inasmuch as the embodiment of FIGS. 7 and 8 is designed to be utilized on a hand held device rather than a device mounted on wheels, I prefer to utilize a hand-operated lever in the nature of the lever 60 depicted in FIG. 3a as the arrangement utilized for operating the dispensing lever 80 of the instant embodiment.

A closure member 86 is threadedly attached on the upper end of the elongate outer member 72, so that a proper amount of material to be dispensed can be added to the interior of the inner member 74 when such becomes necessary.

Although in FIGS. 7 and 8 I have shown only a relationship in which the outer member is fixed, it is obvious that the embodiment designed for use with a string line trimmer or weed whip could take the form of an arrangement in which the inner member is fixed and the outer member is rotatable against the force of a bias with respect to the inner member.

With regard to FIGS. 9, 10 and 11, it is to be noted that in FIG. 9 I have shown the novel dispensing device supported in a substantially horizontal position on the rear end of a power mower, with the dispensing device being relatively close to the ground.

In FIG. 10 I reveal an embodiment designed for Use with a rear-bagger type of power mower, in which the novel dispensing device in accordance with this invention is mounted fairly high on the mower, so as not to interfere with the bag used for catching grass clippings, leaves and the like.

In FIG. 11, an embodiment of my invention is shown being used in conjunction with an edger.

In FIG. 12 I reveal the use of a device along the lines of the embodiment depicted in FIGS. 7 and 8 in place on a weed wacker or string line trimmer. As previously mentioned, I prefer to use a hand-operated device in the nature of hand lever 60 of FIG. 3a for manipulating the dispensing lever 80 of the device utilized on a string line trimmer, for in this way the person using the string line trimmer does not need to remove one hand from the handle bar of the string line trimmer in order to bring about the dispensing of granular or powder material.

I claim:

1. A device for selectively dispensing granular material at the behest of a user, said device comprising inner and outer elongate tubular members, said members being in a closely fitted relationship but being relatively rotatable for a selected number of degrees, said inner member serving as a repository for the granular material to be dispenses, a plurality of holes disposed in a spaced, aligned relationship in each of said members, said members normally residing in a rotational relationship in which the holes in said members are non-aligned, and means attached to one of said members for selectively bringing about relative rotation of said one member with respect to the other member, such that the holes in said members will be brought into alignment, such holes, when in aligned relationship, permitting the dispensing of the granular material, said means being a dispensing lever attached to said one member, and means for biasing said lever to a position in which the holes in said members are brought into a non-aligned relationship, said lever, when moved against said bias means, serving to cause rotation of said one member with respect to the other, and to cause such holes to be brought into alignment, in order that the granular material can be dispensed from the interior of said inner member, said bias means serving, upon said lever being released, to cause relative rotation of said members to a position in which such holes are returned to a non-aligned relationship, therefore causing the dispensing of material to cease.

2. The device for selectively dispensing granular material as recited in claim 1 in which said outer member is fixed, and said inner member is rotated to bring about the dispensing of the granular material.

3. The device for selectively dispensing granular material as recited in claim 1 in which said inner member is fixed, and said outer member is rotated to bring about the dispensing of the granular material.

4. The device for dispensing granular material as recited in claim 1 in which both of said members are disposed substantially in a horizontal position, thus being positioned to be used for dispensing the granular material from a power mower.

5. The device for dispensing granular material as recited in claim 1 in which both of said members are disposed at a substantial angle to the horizontal, thus being positioned to be used for dispensing the material from a weed whip or the like.

6. The device for selectively dispensing granular material as recited in claim 1 in which said dispensing lever is foot operated.

7. The device for selectively dispensing granular material as recited in claim 1 in which said dispensing lever is operatively associated with a hand operated device.

8. The device for selectively dispensing granular material as recited in claim 1 in which the amount of bias can be readily adjusted.

9. The device for selectively dispensing granular material as recited in claim 1 in which removable means are provided on said device, such that said inner member can be refilled with the granular material as needed.

10. A device for selectively dispensing granular material at the behest of a user, said device comprising inner and outer elongate tubular members, with said inner member closely fitted inside said outer member with one of said members being selectively rotatable for a limited number of degrees with respect to the other, said inner member serving as a repository for the granular material to be dispenses, a set of holes disposed in a spaced, aligned relationship in each of said members, said members normally residing in a relationship in which the set of holes in one of said members is out of alignment with the set of holes in said other member, and means attached to said one member for selectively bringing about the rotation of said one member with respect to the other member, such sets of holes, when brought into an aligned relationship by such relative rotation, permitting the dispensing of the granular material from said inner member, a dispensing lever being attached to one of said members, and means for biasing said lever to a position corresponding to the sets of holes in said members being in a non-aligned relationship, said lever, when moved against said bias means, serving to cause rotation of said one member with respect to said other member, and to cause such sets of holes to be brought into alignment, in order that the granular material can be dispensed from the interior of said members, said bias means serving, upon said lever being released, to cause rotation of said one member to a rotational position in which such sets of holes are returned to a non-aligned relationship, therefore causing the dispensing of material to cease.

11. The device for selectively dispensing granular material as recited in claim 10 in which said lever is foot operated.

12. The device for selectively dispensing granular material as recited in claim 10 in which said lever is hand operated.

13. The device for selectively dispensing granular material as recited in claim 10 in which removable means are provided at one end of said device, such that said inner member can be refilled with the granular material.

14. The device for selectively dispensing granular material as recited in claim 10 in which said outer men, her is fixed, and said inner member is rotated to bring about the dispensing of the granular material.

15. The device for selectively dispensing granular material as recited in claim 10 in which said inner member is fixed, and said outer member is rotated to bring about the dispensing of the granular material.

16. The device for dispensing granular material as recited in claim 10 in which both of said members are disposed substantially in a horizontal position, thus being positioned to be used for dispensing the granular material from a power mower.

17. The device for dispensing granular material as recited in claim 10 in which both of said members are disposed at a substantial angle to the horizontal, thus being positioned to be used for dispensing the material from a weed whip or the like.

18. The device for dispensing granular material as recited in claim 10 in which the amount of bias being utilized can be readily adjusted.

19. A device for selectively dispensing granular material at the behest of a user, said device comprising inner and outer elongate tubular members, with said inner member closely fitted inside said outer member and serving as a repository for granular material to be dispensed, one of said members being selectively rotatable for a limited number of degrees with respect to the other member, a set of holes disposed in a spaced, aligned relationship in each of said members, which holes may be moved into alignment at the time of rotation of said one member relative to the other member, bias means for normally biasing said members into a relationship in which the set of holes in said one member is out of alignment with the set of holes in said other member, and rotation producing means attached to said one member for selectively bringing about the rotation of said one member with respect to said other member, against the bias of said bias means, such set of holes, when brought into an aligned relationship by such relative rotation, permitting the dispensing of the granular material from said inner member, out through the holes of said outer member, said bias means serving, upon said rotation producing means being operated in the opposite direction, to cause rotation of said one member to a rotational position in which such sets of holes are returned to a non-aligned relationship, therefore causing the dispensing of material to cease.

* * * * *